June 1, 1965 D. A. IANNUZZI, SR 3,186,362
RAPID RAVIOLI MAKER
Filed March 25, 1963 2 Sheets-Sheet 1
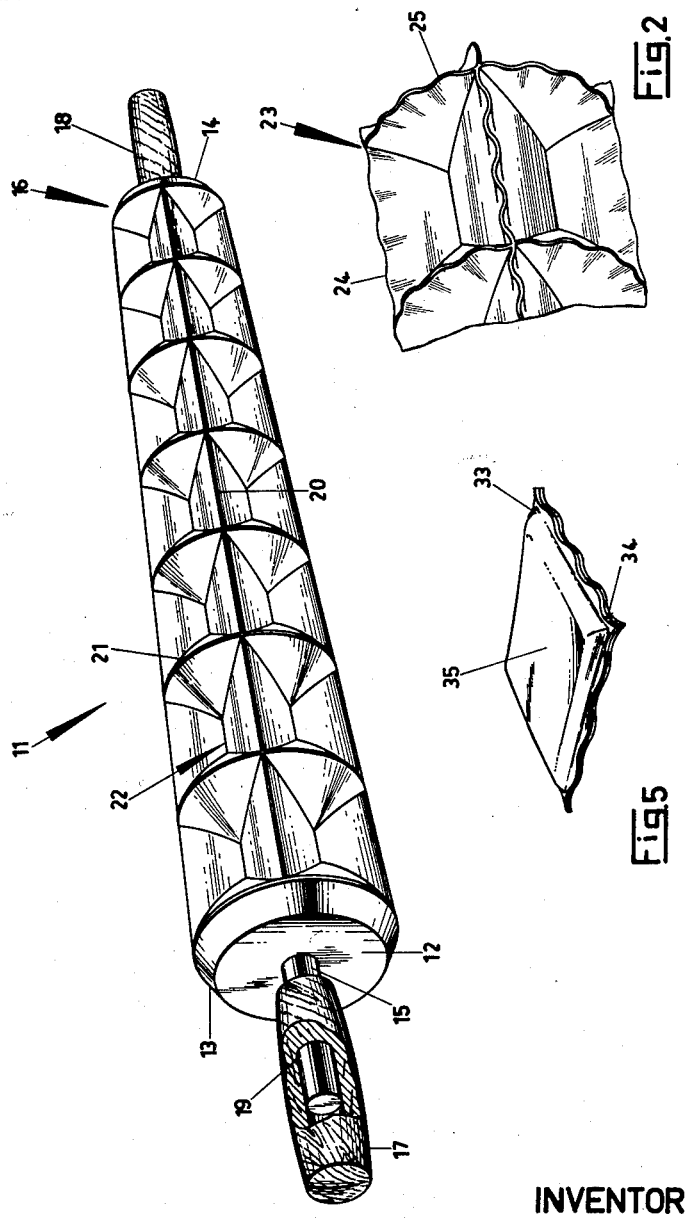
INVENTOR June 1, 1965  D. A. IANNUZZI, SR  3,186,362
RAPID RAVIOLI MAKER
Filed March 25, 1963  2 Sheets-Sheet 2
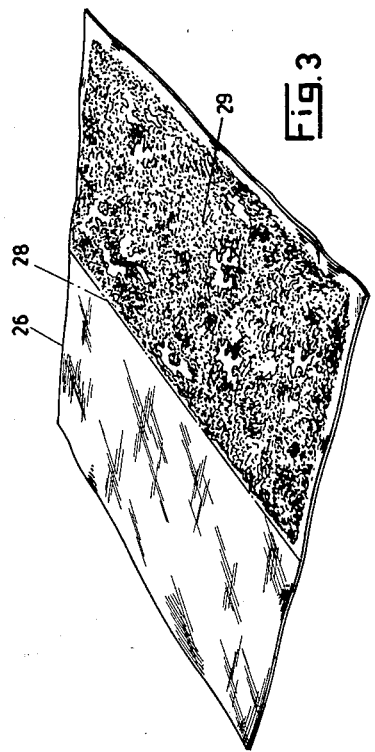
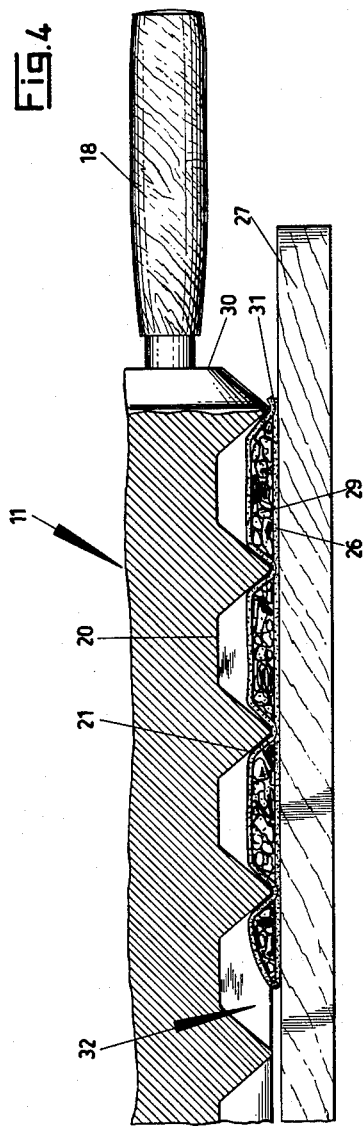
INVENTOR

United States Patent Office 3,186,362
Patented June 1, 1965

3,186,362
RAPID RAVIOLI MAKER
Daniel A. Iannuzzi, Sr., Willowdale, Ontario, Canada
(2901 Jane St., Suite 61, Downsview, Ontario, Canada)
Filed Mar. 25, 1963, Ser. No. 268,514
3 Claims. (Cl. 107—47)

This invention relates to improvements in methods and apparatus for the making of ravioli patties and similar regular dough shapes.

It is common practice in the making of ravioli to first provide a rolled out sheet of dough which is thereafter cut into individual squares. Meat or other filling is then heaped upon one square whereafter a second square is placed over top of the first and the edges sealed by means of a fork or by using the fingers.

It will be appreciated that such methods are quite time consuming and since the ravioli is ordinarily quite small, a considerable amount of time must be expended in order that a housewife may make a sufficient number for one meal.

It is accordingly an object of the present invention to provide a method for making ravioli which will enable a person such as a housewife to produce a large number of ravioli in a comparatively short time.

It is a still further object of this invention to provide a method of making ravioli which will yield a superior ravioli of more uniform proportions.

It is a further object of this invention to provide a method of making ravioli which will provide for the automatic sealing of the edges thereby ensuring proper retention of the filling therein.

It is a still further object of this invention to provide a method of making ravioli in mass production.

It is still a further object of this invention to provide apparatus for the making of ravioli which will be simple in construction, rendering such apparatus simple to clean and simple to operate.

These and other objects and features will become apparent from the following detailed description and accompanying drawings, in which:

FIG. 1 is a perspective view of a presently preferred embodiment of this invention.

FIG. 2 is a fragmentary perspective view of a second preferred embodiment of this invention.

FIG. 3 is a perspective view of a rolled out piece of dough and illustrates a portion of the present method.

FIG. 4 is a sectional view showing how the ravioli are formed.

FIG. 5 is a perspective view of a finished ravioli.

Having reference to FIG. 1, the dough cutting device indicated generally as 11 comprises a body 12 having end members 13 and 14 and being of a generally cylindrical configuration.

A pair of handle supports 15 and 16 are secured centrally of body 12 and substantially along the axis thereof and are adapted to rotatably support a pair of handles 17 and 18. In this preferred embodiment supports 15 and 16 are each crimped to form a bead, the bead 19 being shown in FIG. 1, whereby handles 17 and 18 are secured to said supports for rotation.

A plurality of longitudinal cutting edges 20 are disposed about and integral with the circumference of body 12 and a plurality of integral circumferential cutting edges 21 are disposed along the length thereof. The intersecting edges 20 and 21 form a plurality of shaped forms which in the embodiment as illustrated are a plurality of prismatoidal forms 22. The two sides forming cutting edges 20 and 21 have a considerable included angle, this being shown more definitely in FIG. 4 in which the included angle is in excess of 45 degrees.

Referring to FIG. 2, a second preferred embodiment of this invention is illustrated and indicated generally as 23. As will be seen, a plurality of longitudinal cutting edges 24 and a plurality of circumferential cutting edges 25 are again provided but in this preferred embodiment the cutting edge is wavy or crimped whereby upon cutting of dough, the forms are provided with crimped or wavy edges. It will be understood that although one type of crimped edge is illustrated in the drawings in FIG. 2 that other types of irregular edges may also be used, the general form of the cutting edge still being as illustrated in FIG. 1.

Having now described preferred embodiments of the apparatus of the present invention, it is desired to explain the method of utilizing this. From FIGS. 3 and 4, it will be seen that the present method involves the use of a suitable dough 26 placed upon a working surface 27.

The first step in the method is to roll out the dough 26 substantially as illustrated in FIG. 3 whereafter dough 26 may be folded in half upon itself and thereafter laid out flat again. This leaves a fold line 28 on the dough material and serves as a guide in determining the extent of the placing of mixture 29 thereon. It is preferable to dust the upper surface of dough 26 with flour prior to folding it over to prevent the surfaces from inadvertently being stuck together.

The filling material which may be in the form of puree is spread over one half surface of dough 26 in a substantially even layer the filling being spread towards the edges where a small clear strip is left thereabout.

The uncovered portion of dough is thereafter spread with a mixture such as egg white and yolk mixed together, which serves as a gluing agent for the two layers of dough in the subsequent steps. It will be seen that at this point there is provided a half sheet of dough containing a filling mixture and a similar half sheet of dough being covered with a gluing agent. The next step is to fold the uncovered dough portion over on top of the mixture whereby a comparatively straight edge along line 28 is provided, there then being one sealed edge at line 28 and three open edges at this stage.

The next step is to place device 11 on the folded dough so that one end edge 30 is substantially in line with open edge 31 of dough 26, whereafter the device 11 is rolled thereon, even pressure being applied to handles 17 and 18 as the device is rolled. As is usual with the rolling of dough, it is preferable to dust the upper surface of the folded over portion of dough 26 to aid in preventing device 11 from sticking thereto.

As rolling progresses, it will be seen that cutting edges 21 will divide the sandwich as formed, into longitudinal strips and the cutting edges 20, that is to say, the transverse cutting edges will similarly divide the sandwich into transverse strips the net effect being individual ravioli being in the shape of forms 22. It is of importance to note that during the rolling and cutting action that the sloping sides of edges 20 and 21 tend to force the mixture 29 towards the centre of each individual ravioli and in addition give the ravioli the distinctive regular and appealing appearance.

The gluing mixture, as previously applied to one half of the dough 26, aids in securing the severed edges of the dough sandwich together. In the event that the free edge of the sandwich may fall substantially midway between cutting edges 21 such as is indicated at 32 in FIG. 4, it will be seen that this edge 28 is the folded edge and for this reason the portion of a ravioli formed will be still intact and not wasted. To help in eliminating waste, it is also advisable to place one longitudinal cutting edge 20 along the first edge of the sandwich formed by folding over dough 26, a complete ravioli being thereby formed.

A number of advantages are to be gained by the use of the present method and apparatus, one of the most important being the elimination of waste. It will be seen that by the use of prior methods a great deal of waste is incurred at the edges of the dough. It is not desirable to throw this material away, therefore it is re-kneaded and rolled out again for further use. This constant re-kneading of the dough toughens it and results in a tough crust in the finished ravioli.

It will be seen however, that by resort to the present method there is no waste and the dough need be rolled only once, the result being a light crust on the ravioli. The present method allows a great number of ravioli to be rapidly made, the saving of time being of considerable importance to the housewife. As an example, it has been found by the practice of this invention that the time required is reduced to one tenth in comparison with conventional methods, thereby allowing the user to make ten times as many individual ravioli in the same time as would be required by conventional means. Thus in one afternoon's baking a housewife may make sufficient ravioli for five or six meals, the superfluous ravioli being placed in frozen storage for later use. It has also been found that approximatey one hundred and twenty-five ravioli may be made from a single sandwich as illustrated in FIGS. 3 and 4 and from this it will be seen that the making of, for instance, one thousand ravioli in one afternoon would be well within possible limits.

It is worthwhile to note that the instant device is particularly suited in the utilization of a very thin type of dough for ravioli patties. This has many advantages when cooking due to the thinness of the dough resulting in a more rapid and even cooking thus increasing the flavour and appearance of the finished ravioli.

Referring to FIG. 5, a finished ravioli 33 is shown illustrating particularly a typical crimped edge 34, and ballooned centre portion 35 obtained by the bluntly tapered edges of the instant device pressing the filling mixture into centre portion 35.

It is to be further understood that although specific embodiments have presently been disclosed, the invention contemplates such alterations as may fall within the scope of the appended claims.

What is claimed is:

1. A dough cutting device comprising a body member; a plurality of cutting edges disposed about said body member, said cutting edges defining a generally cylindrical configuration; said cutting edges being integral with said body member; sloping sides on said cutting edges, whereby an angled edge greater than 45 degrees is formed on said cutting edges; said cutting edges intersecting to provide a plurality of prismatoidal forms therebetween; and a pair of handles extending from either end of said body member substantially on the axis thereof.

2. A dough cutting device as claimed in claim 1 characterized by crimped cutting edges.

3. A dough cutting device comprising a body member; a plurality of cutting edges disposed about said body member, said cutting edges defining a generally cylindrical configuration; sloping sides on said cutting edges, whereby an angled edge greater than 45 degrees is formed on said cutting edges; said cutting edges intersecting to provide a plurality of prismatoidal forms therebetween; a pair of handle supports secured on said body member at either end substantially on the axis thereof; and a handle rotatably secured to each said handle supports.

References Cited by the Examiner

UNITED STATES PATENTS

| | | | |
|---|---|---|---|
| 550,337 | 11/95 | Wolff et al. | 107—50 |
| 925,919 | 6/09 | Kimmel | 30—306 |
| 1,479,925 | 1/24 | Oleri | 107—47 |
| 1,814,485 | 7/31 | Moss | 107—54.28 |
| 1,841,494 | 1/32 | Mears | 107—54.28 |
| 2,007,768 | 7/35 | Olevin | 30—306 |
| 2,248,957 | 7/41 | Casali | 107—47 |
| 2,718,853 | 9/55 | Zichichi | 107—47 |

ROBERT E. PULFREY, *Primary Examiner.*
WILLIAM B. PENN, CHARLES A. WILLMUTH, *Examiners.*